United States Patent
Masci

(10) Patent No.: US 12,211,217 B2
(45) Date of Patent: Jan. 28, 2025

(54) METHOD OF DETECTING MOVING OBJECTS

(71) Applicant: The Edge Company S.R.L., Rimini (IT)

(72) Inventor: Fabio Masci, Rimini (IT)

(73) Assignee: THE EDGE COMPANY S.R.L., Rimini (IT)

( * ) Notice: Subject to any disclaimer, the term of this patent is extended or adjusted under 35 U.S.C. 154(b) by 421 days.

(21) Appl. No.: 17/616,326

(22) PCT Filed: Jun. 1, 2020

(86) PCT No.: PCT/IT2020/050138
§ 371 (c)(1),
(2) Date: Dec. 3, 2021

(87) PCT Pub. No.: WO2020/245856
PCT Pub. Date: Dec. 10, 2020

(65) Prior Publication Data
US 2022/0327716 A1    Oct. 13, 2022

(30) Foreign Application Priority Data
Jun. 3, 2019    (IT) .................... 102019000007815

(51) Int. Cl.
*G06T 7/246*    (2017.01)
*G06T 7/12*    (2017.01)
(Continued)

(52) U.S. Cl.
CPC ............ *G06T 7/246* (2017.01); *G06T 7/12* (2017.01); *G06T 7/215* (2017.01); *G06T 7/73* (2017.01)

(58) Field of Classification Search
None
See application file for complete search history.

(56) References Cited

U.S. PATENT DOCUMENTS 9,177,224 B1 * 11/2015 Heller ............... G06V 10/462
10,977,554 B2 * 4/2021 Rabinovich ........... G06N 3/048
(Continued)

OTHER PUBLICATIONS

International Search Report and Written Opinion dated Sep. 21, 2020 from counterpart International Patent Appllication No. PCT/IT2020/050138.
(Continued)

*Primary Examiner* — Ian L Lemieux
(74) *Attorney, Agent, or Firm* — SHUTTLEWORTH & INGERSOLL, PLC; Timothy J. Klima

(57) ABSTRACT

A method of detecting moving objects, including the following steps: extracting first and second images from a video of an observed space; detecting corner points in the images; using the points, extracting a feature vector; identifying corresponding points in the images; determining a homography to perform image registration between the images; applying a warping of the second image based on the homography to obtain a warped second image; calculating a difference in individual pixels between the warped second image and the first image to identify pixels that differ; obtaining a third image by comparing the second warped image against the first image; identifying a bounding box in the third image for each group of adjacent pixels; calculate the optical flow based on the first image and the warped second image; extracting from the optical flow a matrix corresponding to the magnitude of the optical flow.

11 Claims, 4 Drawing Sheets

(51) Int. Cl.
    *G06T 7/215* (2017.01)
    *G06T 7/73* (2017.01)

(56) References Cited

U.S. PATENT DOCUMENTS

| | | | |
|---|---|---|---|
| 2003/0081836 A1* | 5/2003 | Averbuch | G06T 7/12 382/199 |
| 2008/0273751 A1* | 11/2008 | Yuan | G06T 7/579 382/103 |
| 2011/0052003 A1 | 3/2011 | Cobb et al. | |
| 2012/0154579 A1* | 6/2012 | Hampapur | G06T 7/223 382/103 |
| 2014/0211987 A1* | 7/2014 | Fan | G06V 20/52 382/103 |
| 2017/0221217 A1* | 8/2017 | Hong | G06T 7/337 |
| 2017/0277966 A1* | 9/2017 | Abousleman | G06V 10/25 |
| 2018/0096555 A1* | 4/2018 | Schtein | G07F 11/007 |
| 2018/0158199 A1* | 6/2018 | Wang | G06T 3/18 |
| 2019/0057588 A1 | 2/2019 | Savvides et al. | |
| 2020/0279121 A1* | 9/2020 | Stanimirovic | G06V 10/143 |

OTHER PUBLICATIONS

Anonymous: "Feature Matching + Homography to find a known object" Jan. 12, 2019 (Jan. 12, 2019) XP055651162 http://amroamroamro.github.io/mexopencv/opencv/feature homography demo.html Retrieved from the Internet: URL:https://web.archive.org/web/20190112142812/http://amroamroamro.github.io/mexopencv/opencv/feature homography demo.html.

Lezki Hazal et al: "Joint Exploitation of Features and Optical Flow for Real-Time Moving Object Detection on Drones". Jan. 29, 2019 (Jan. 29, 2019). ROBOCUP 2008: ROBOCUP 2008: Robot Soccer World Cup XII; [Lecture Notes in Computer Science; Lect.Notes Computer]. Springer International Publishing. Cham. pp. 100-116. XP047501663. ISBN: 978-3-319-10403-4.

* cited by examiner

METHOD OF DETECTING MOVING OBJECTS

This application is the National Phase of International Application PCT/IT2020/050138 filed Jun. 1, 2020 which designated the U.S.

This application claims priority to Italian Patent Application No. 102019000007815 filed Jun. 3, 2019, which application is incorporated by reference herein.

The present invention relates to a method of detecting moving objects

PRIOR ART

Various methods are currently known for detecting moving objects, which use "motion detection" algorithms. These algorithms are based on computer vision techniques, using videos taken by cameras as their starting point.

The cameras are usually fixed. Their frame can vary, but they cannot be moved close to the object. To move closer or to follow moving object, a drone, that is to say a small aircraft radio-controlled from the ground, can be used.

Nowadays, drones have various applications: security and tracking, environmental and architectural monitoring, remote sensing, collecting qualitative and quantitative data on a specific territory following analysis of electromagnetic radiation emitted or reflected, and video footage. Video footage, in particular, enables the detection of objects moving near the drone.

An application of interest for detecting moving objects is the automatic detection and monitoring of birds in a space or an area, such as monitoring birdlife around airports to increase flight safety.

Usually, monitoring the presence of birds in an observed space or area is performed by having the observation space watched by personnel equipped with viewing systems such as telescopes or binoculars. These methods do not allow the detection of birds in the observation space to be fully automated. In addition, observation by personnel on-site is heavily subjective and conditioned by parameters such as the preparation and the level of knowledge of the personnel themselves.

Currently, radar systems also exist for detecting birds.

These radar systems require highly specialised personnel for interpreting the information and for maintenance, and therefore have very high costs.

Recently, monitoring methods based on computer vision techniques have been developed, in which birds are detected in videos taken by one or more cameras placed near the observation space. Currently, computer vision algorithms exist to detect moving objects that use the optical flow technique, which is mainly used for estimating motion between two consecutive frames in a video.

However, methods based on these known algorithms have limitations. For instance, such methods are unable to detect moving objects that are small in size relative to those that may instead be image artifacts caused by video compression. Furthermore, these methods are not able to optimally handle videos captured by a moving camera, such as a camera attached to a drone. In fact, in most methods based on optical flow for detection, a standard background (which does not move) is used relative to the foreground object (which does move). In the case of a moving device, both the background and the foreground are moving and therefore it is very difficult, if not impossible, to recreate the standard background to make the detection, especially if the object is very small.

DESCRIPTION OF THE INVENTION

The purpose of the present invention is to improve the detection of moving objects in videos, thus making it more reliable.

An additional purpose of the present invention is to enable detection even when using a movie taken by a moving device, such as a video camera, as the starting point.

The invention achieves these purposes thanks to a method of detecting moving objects with features as disclosed herein.

The method enables the reliable identification of objects that are effectively in motion, even if small. Furthermore, it does not require a standard background to be created. Moving objects can be detected by a camera that is also in motion, which can then move closer to the object, thus making detection more reliable.

Advantageously, a low pass filter is used to remove the high frequencies present in the image obtained from the difference between the first image and the second warped image, and/or a threshold is applied to this image to identify the pixels that differ between the second warmed image and the first image.

In a preferred embodiment, two profiles are extracted along the reference axes X and Y for each undiscarded bounding box, the alignment between the two profiles is checked and any bounding box with unaligned profiles is discarded.

These steps enable "false positives" to be limited, namely when moving objects that might not be of interest, such as tree branches, are classified as objects of interest, such as birds.

BRIEF DESCRIPTION OF THE DRAWINGS

Further advantages and features of the present invention will become more apparent from the detailed description below with reference to the accompanying drawings, which show a non-limiting embodiment, in which.

PREFERRED EMBODIMENTS OF THE INVENTION

Figure 1:
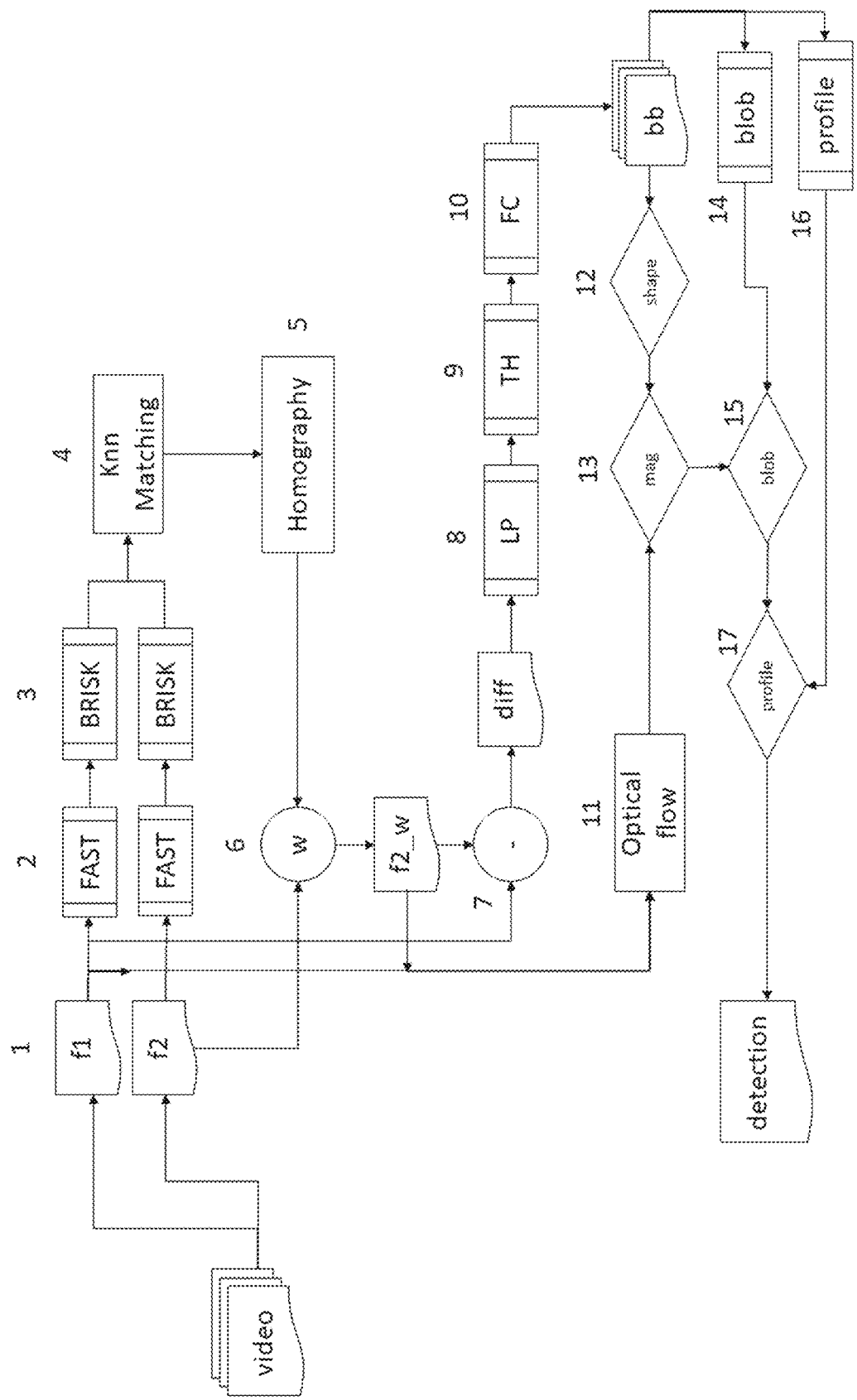
FIG. 1 shows a diagram of a preferred embodiment of the method according to the present invention.

FIG. 1 shows a diagram of a preferred embodiment of the method according to the present invention.

The method of detecting moving objects requires a film (or video) of an observation space to be made.

According to the invention, the detection method comprises step 1: extracting at least one first image (f1) and at least one second image (f2) from the film.

The images (frames) that form the video are in colour and are made up of pixels. In particular, the resolution is 1280×720 pixels with a variable frame rate of between 24 and 60 frames per second.

Preferably, the second image (f2) is consecutive to the first image (f1).

In step 2, corner points are detected in the first image (f1) and in the second image (f2). In particular, in step 2 a series of edge and corner points are detected in the first image (f1) and in the second image (f2). Corners mean the intersection of two or more edges.

Advantageously, points are detected by applying the FAST (Features from Accelerated Segment Test) algorithm for the detection of corners.

Figure 2:
FIG. 2 shows an image in which the edges and corners have been detected.

FIG. 2 shows the FAST algorithm being applied to a frame, in which each circle corresponds to a point of interest.

In step 3, feature vectors—that is, n-dimensional vectors describing the features of the object—are extracted using the points identified; in particular, one is extracted for each point identified. Advantageously, the BRISK (Binary Robust Invariant Scalable Keypoints) descriptor is used, which is scale and rotation invariant; this property is suitable for cases where the scene could be subject to scale and rotation variations due to the movement of the recording device, such as a camera installed on a drone.

Figure 3:
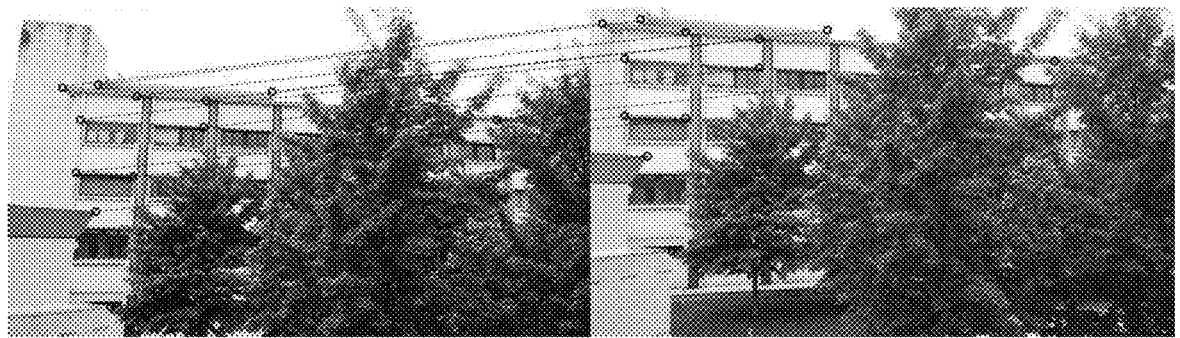
FIG. 3 shows two successive images in which corresponding points are identified.

In step 4, corresponding points are identified in the first image (f1) and in the second image (f2). A matching is made, for instance by using the KNN (k-nearest neighbours) algorithm between the points and the descriptors extracted from the two frames (f1), (f2) in order to identify corresponding points in the two scenes. FIG. 3 shows the match identified between the points of two consecutive frames, in which each point identified in a frame is connected by a segment to the corresponding point in the next frame.

Once the matches have been identified, these are used in step 5 to estimate the homography, namely the geometric transformation that enables a registration to be made between the first image (f1) and the second image (f2); in other words, aligning/overlapping the two images framing the same scene from two different points of view.

In step 6, a warping is applied digitally to the second image (f2), based on the homography, to obtain a warped second image (f2_w).

In step 7, the difference in individual pixels is calculated between the warped second image (f2_w) and the first image (f1) to identify the pixels that differ.

A third image (diff) is thus obtained by comparing the second warped image (F2_w) against the first image (f1).

In particular, a third image (diff) is obtained from a comparison between the second warped image (f2_w) and the first image (f1) by calculating the difference in individual pixels between the warped second image (f2_w) and the first image (f1) to identify the pixels that vay.

Preferably, in step 8, on the image (diff) obtained from the difference between the second warped image (f2_w) and the first image (f1), a low pass filter (LP) is used to remove the high frequencies present in the image, which could be caused by artifacts due to image compression.

In a preferred embodiment, thresholding is carried out in step 9 to determine the pixels that differ between the two frames.

Thresholding is an image segmentation process which takes a grayscale image and returns a black-and-white binary image.

Advantageously, Otsu's method of automatic thresholding of image histogram (TH) is used, which graphically shows the tonal distribution of a digital image. This method assumes that only two classes are present in the thresholding image, thus calculating the optimal threshold to separate these two classes by minimising intra-class variance.

Figure 4:
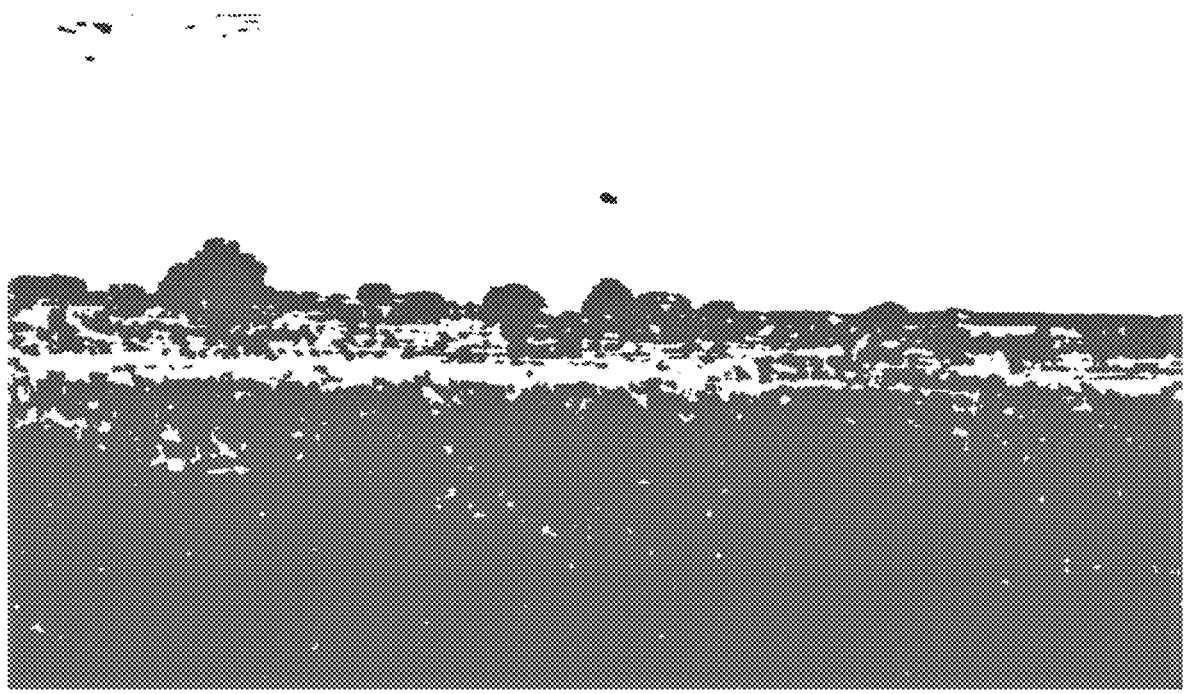
FIG. 4 shows an image after thresholding has been applied.

FIG. 4 shows the image following thresholding, in which the pixels that differ most in the scene are shown in black, whereas those that are unchanged are in white.

Steps 8 and 9 may be absent, only one of them may be present, or both of them may be present.

In a preferred embodiment, step 9 is present.

Figure 5:
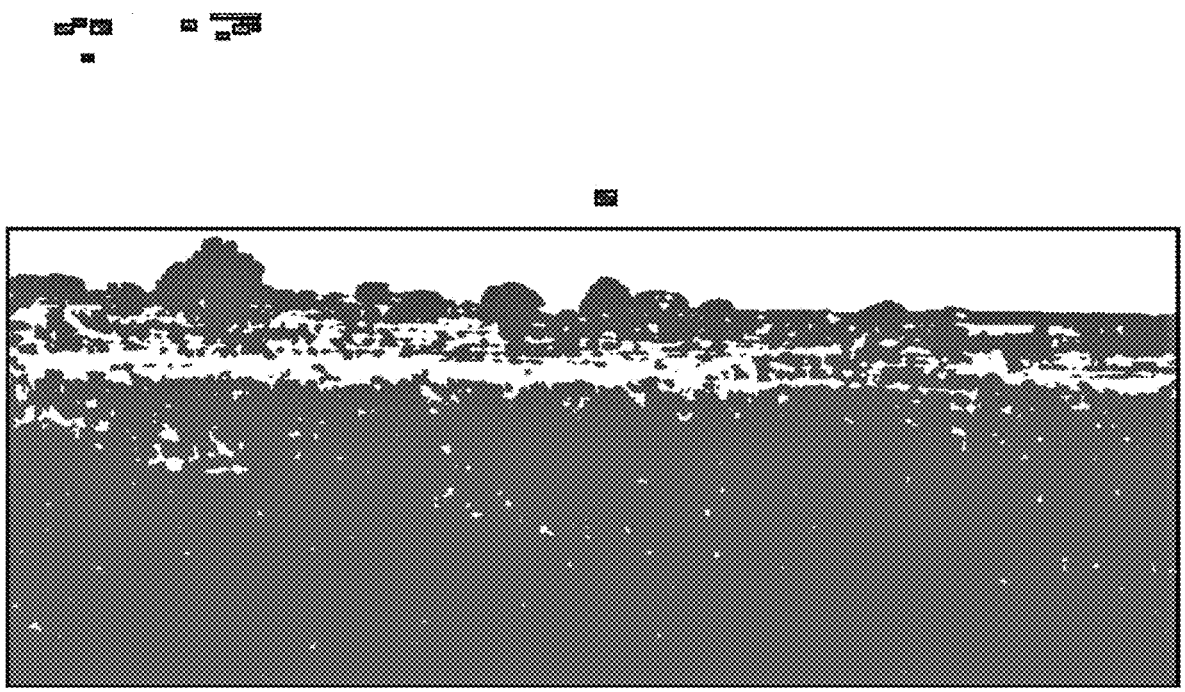
FIG. 5 shows an image on which bounding boxes are applied.

According to the invention, in step 10 (Finding Contours), all contours (bounding boxes) relating to groups of adjacent pixels are identified in the third image (diff) or in the image obtained by thresholding or by applying the filter. FIG. 5 shows the image with rectangles (bounding boxes) printed on the contours identified. In particular, a bounding box (bb) is identified in the third image (diff) for each group of contiguous pixels having image difference values above a threshold.

According to the invention, in step 11, the optical flow is calculated based on the first image (f1) and the warped second image (f2_w).

In particular, the optical flow is calculated by comparing the second warped image (F2_w) against the first image (f1), as shown in FIG. 1.

Step 11 may be simultaneous to, before or after steps 8-10.

In an advantageous embodiment, the optical flow is calculated using the Farnebäck method. This method is described in Gunnar Farnebäck's article "Two-Frame Motion Estimation Based on Polynomial Expansion".

From the optical flow, a matrix (mag) corresponding to the magnitude of the optical flow is extracted.

The extracted matrix can be viewed as an image in which different colours are used to indicate the magnitude of the optical flow.

An advantageous embodiment includes a step 12, in which, for each bounding box (bb) extracted, the area of the rectangle and the ratio between the sides are checked to ensure that the element identified is not too small or too large and that the arrangement of the pixels is not too elongated.

If this condition is not met, the bounding box (bb) is discarded.

According to the invention, in step 13, for each bounding box (bb) drawn on the third image (diff), it is checked whether the optical flow magnitude (corresponding to the motion's magnitude) of a detected pixel group (which could be an object of interest) is greater than the average magnitude of the optical flow of the surrounding pixels (i.e. whether they are moving differently relative to background elements, which may also be moving) This allows to determine whether the detected pixel group moves in a different way than background elements. If the optical flow magnitude of the group of adjacent pixels—corresponding to the magnitude of the potential object of interest—is not greater than the average magnitude of the surrounding pixels, the bounding box (bb) is discarded.

In step 14, a blob detector is applied to each bounding box (bb) to identify the presence of blobs inside each individual bounding box (bb) forming part of the third image (diff); namely of points and/or regions in the image whose properties such as brightness or colour differ in comparison with the environment.

In step 15, if there is no blob, the bounding box (bb) is discarded.

Preferably, the bounding box (bb) is discarded even if more than one blob is present, while a bounding box (bb) with only one blob is considered a valid detection.

An advantageous embodiment includes a step 16, in which two profiles are extracted along the reference axes X and Y for each undiscarded bounding box (bb). This is done by adding the value of the pixels along the image's two axes. Then, in step 17, it is checked that the two profiles are well aligned in order to verify that the blob is convex. If the profiles are not aligned, the bounding box (bb) is discarded.

Figure 6:
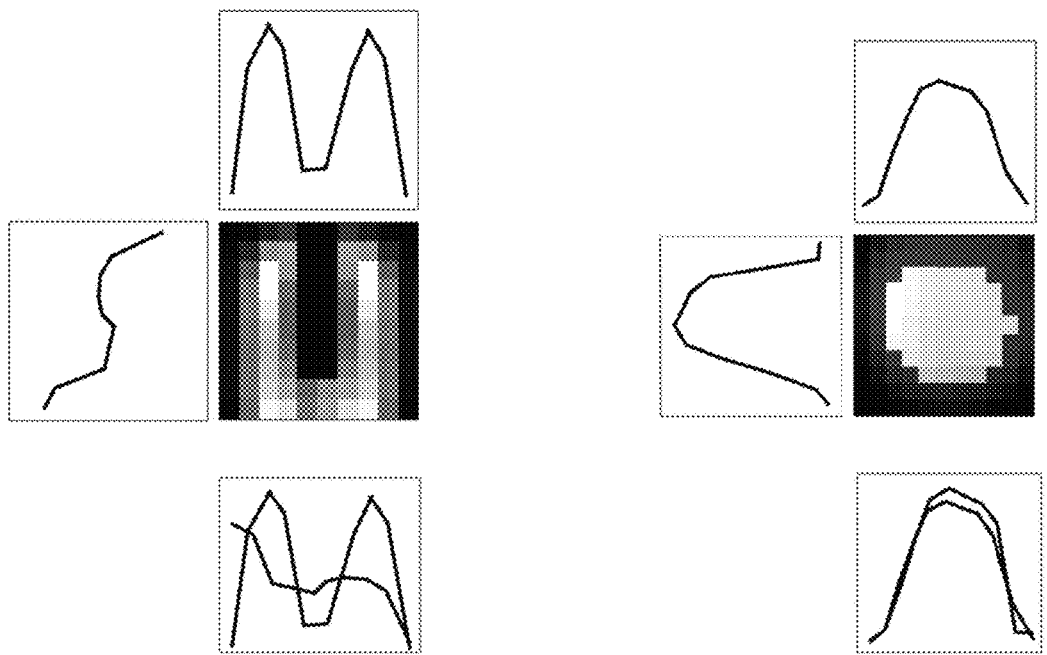
FIG. 6 shows the extraction of profiles from two bounding boxes.

FIG. 6 shows two examples of profile extraction: in the first, on the left, the two profiles are not aligned and therefore the bounding box (bb) is discarded, whereas in the second one, on the right, the profile verification gave a positive result and therefore the bounding box (bb) is considered a valid detection.

A bounding box (bb) that is not discarded is considered a valid detection.

The method according to the present invention therefore allows determined moving objects, even if small, to be detected.

In addition, since it can be implemented by taking a video acquired by a moving camera as its starting point, it allows films to be taken near the moving object and, therefore, enables the detection of elements that are actually of interest.

The invention claimed is:

1. A method of detecting a moving object, comprising the following steps:
    extract a first image and a second image from a video of an observed space;
    detect corner points in the first image and in the second image;
    using the detected corner points, extract a feature vector for each detected corner point;
    identify corresponding corner points in the first image and in the second image;
    determine a homography to perform image registration between the first image and the second image;
    apply a warping of the second image based on the homography to obtain a warped second image;
    obtain a third image from a comparison between the warped second image and the first image by calculating a difference in individual pixels between the warped second image and the first image to identify pixels that differ;
    identify at least one bounding box in the third image for a selected group of pixels adjacent to one another;
    calculate an optical flow between on the first image and the warped second image;
    extract from the optical flow a matrix corresponding to a magnitude of the optical flow;
    for each of the at least one bounding box in the third image, check whether the optical flow magnitude of the selected group of pixels for the each of the at least one bounding box is greater than an average magnitude of surrounding pixels surrounding the each of the at least one bounding box;
    discard any of the at least one bounding box if the optical flow magnitude thereof is not greater than the average magnitude of the surrounding pixels;
    use a blob detector for each of the at least one bounding box drawn on the third image;
    discard any of the at least one bounding box having blobs; and
    assign detection of a moving object to any undiscarded ones of the at least one bounding box.

2. The method according to claim 1, wherein the second image is consecutive to the first image.

3. The method according to claim 1, wherein in the step of identifying corner points in the first image and in the second image, each corner point identified in the first image is segment-connected to a corresponding corner point in the second image.

4. The method according to claim 1, wherein before identifying the at least one bounding box, applying a low pass filter to eliminate high frequencies present in the third image.

5. The method according to claim 1, wherein before the at least one bounding box is identified, applying a thresholding to the third image to highlight the pixels that differ between the warped second image and the first image.

6. The method according to claim 5, wherein Otsu's method of automatic thresholding of image histogram is used for the thresholding.

7. The method according to claim 1, wherein the optical flow is calculated using the Farnebäck method.

8. The method according to claim 1, wherein each of the at least one bounding box is shaped as a rectangle and an area of the rectangle and a ratio between the sides of the rectangle are calculated for each of the at least one bounding box.

9. The method according to claim 1, and further comprising discarding any of the at least one bounding box having more than one blob.

10. The method according to claim 1, wherein after using the blob detector, extracting two profiles along the reference axes for each undiscarded ones of the at least one bounding box, the alignment between the two outlines is checked and discarding any of the at least one bounding box with unaligned outlines.

11. The method according to claim 1, and further comprising recording the video with a moving device.

* * * * *